(12) United States Patent
Chopra et al.

(10) Patent No.: US 11,625,292 B2
(45) Date of Patent: Apr. 11, 2023

(54) SYSTEM AND METHOD FOR SELF-HEALING OF UPGRADE ISSUES ON A CUSTOMER ENVIRONMENT AND SYNCHRONIZATION WITH A PRODUCTION HOST ENVIRONMENT

(71) Applicant: EMC IP Holding Company LLC, Hopkinton, MA (US)

(72) Inventors: Shelesh Chopra, Bangalore (IN); Anannya Roy Chowdhury, Jamshedpur (IN); Parminder Singh Sethi, Ludhiana (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 38 days.

(21) Appl. No.: 17/355,333

(22) Filed: Jun. 23, 2021

(65) Prior Publication Data
US 2022/0382619 A1    Dec. 1, 2022

(30) Foreign Application Priority Data
May 27, 2021 (IN) .............................. 202141023624

(51) Int. Cl.
*G06F 11/00* (2006.01)
*G06F 11/07* (2006.01)
(Continued)

(52) U.S. Cl.
CPC ...... *G06F 11/0784* (2013.01); *G06F 11/0787* (2013.01); *G06F 11/3055* (2013.01); *G06F 18/213* (2023.01); *G06F 18/214* (2023.01)

(58) Field of Classification Search
CPC ............ G06F 11/0784; G06F 11/0787; G06F 11/3055; G06F 11/0766; G06F 11/0793;
(Continued)

(56) References Cited

U.S. PATENT DOCUMENTS

| 9,813,379 B1 | 11/2017 | Shevade et al. |
| 10,530,667 B2 | 1/2020 | Calo et al. |

(Continued)

*Primary Examiner* — Joseph D Manoskey
(74) *Attorney, Agent, or Firm* — Chamberlain, Hrdlicka, White, Williams & Aughtry (57) ABSTRACT

A method for managing applications includes obtaining, by a client in a customer environment, an upgrade issue report for the application, making a first determination that a resynchronization of a client self-healing classification model with the production host environment (PHE) self-healing classification model is required, wherein the PHE self-healing classification model is stored in the PHE, performing the resynchronization with the PHE self-healing classification model to obtain a synchronized client self-healing classification model, applying the synchronized client self-healing classification model to the upgrade issue report to obtain a state of the upgrade issue report, making a second determination that the state indicates a self-healable state, based on the second determination, performing a self-healing process on the application based on the upgrade issue report, and storing a resolution report based on results of the self-healing process, wherein the PHE is operatively connected to the customer environment.

20 Claims, 6 Drawing Sheets

(51) Int. Cl.
*G06F 11/30* (2006.01)
*G06F 18/213* (2023.01)
*G06F 18/214* (2023.01)

(58) Field of Classification Search
CPC .... G06F 11/079; G06F 11/302; G06F 18/214; G06F 18/213; G06K 9/6232; G06K 9/6256

See application file for complete search history.

(56) References Cited

U.S. PATENT DOCUMENTS

| | | | |
|---|---|---|---|
| 10,860,451 B1 | 12/2020 | Murthy et al. | |
| 10,963,333 B1 | 3/2021 | Nijim et al. | |
| 11,140,738 B1 | 10/2021 | Rane | |
| 11,190,965 B2 | 11/2021 | Ramos De Azevedo | |
| 11,398,960 B1* | 7/2022 | Chopra | H04L 41/5025 |
| 2004/0123285 A1* | 6/2004 | Berg | G06F 11/1438 |
| | | | 714/E11.135 |
| 2004/0153823 A1* | 8/2004 | Ansari | G06F 11/0793 |
| | | | 714/38.14 |
| 2018/0113773 A1* | 4/2018 | Krishnan | G06F 11/079 |
| 2018/0365309 A1 | 12/2018 | Oliner et al. | |
| 2018/0375720 A1* | 12/2018 | Yang | H04L 41/084 |
| 2019/0095470 A1 | 3/2019 | Dundjerski et al. | |
| 2020/0081788 A1* | 3/2020 | Kataki | G06F 11/0712 |
| 2020/0110395 A1 | 4/2020 | Le et al. | |
| 2020/0235986 A1 | 7/2020 | Embarmannar Vijayan et al. | |
| 2020/0278901 A1 | 9/2020 | Singh et al. | |
| 2020/0364561 A1 | 11/2020 | Ananthanarayanan et al. | |
| 2020/0387357 A1 | 12/2020 | Mathon et al. | |
| 2020/0403406 A1 | 12/2020 | Shafiullah et al. | |
| 2021/0019612 A1* | 1/2021 | Carrasco | G06N 5/003 |
| 2021/0042180 A1 | 2/2021 | Sutton et al. | |
| 2021/0200950 A1 | 7/2021 | Basu et al. | |
| 2021/0216526 A1* | 7/2021 | Barrett | G06F 11/302 |
| 2021/0248289 A1 | 8/2021 | Fasano | |
| 2021/0297432 A1 | 9/2021 | Hicks et al. | |
| 2021/0303388 A1 | 9/2021 | George et al. | |

* cited by examiner

SYSTEM AND METHOD FOR SELF-HEALING OF UPGRADE ISSUES ON A CUSTOMER ENVIRONMENT AND SYNCHRONIZATION WITH A PRODUCTION HOST ENVIRONMENT

BACKGROUND

Computing devices in a system may include any number of internal components such as processors, memory, and persistent storage. As computing devices experience failures, internal or external systems may track undesirable behaviors by applications executed using the internal components.

SUMMARY

In general, in one aspect, the invention relates to a method for managing an application in a production host environment. The method includes obtaining, by a client in a customer environment, an upgrade issue report for the application, making a first determination that a resynchronization of a client self-healing classification model with the production host environment (PHE) self-healing classification model is required, wherein the PHE self-healing classification model is stored in the PHE, based on the first determination, performing the resynchronization with the PHE self-healing classification model to obtain a synchronized client self-healing classification model, applying the synchronized client self-healing classification model to the upgrade issue report to obtain a state of the upgrade issue report, making a second determination that the state indicates a self-healable state, based on the second determination, performing a self-healing process on the application based on the upgrade issue report, and storing a resolution report based on results of the self-healing process, wherein the PHE is operatively connected to the customer environment.

In general, in one aspect, the invention relates to a non-transitory computer readable medium that includes computer readable program code, which when executed by a computer processor enables the computer processor to perform a method for managing applications. The method includes obtaining, by a client in a customer environment, an upgrade issue report for the application, making a first determination that a resynchronization of a client self-healing classification model with the production host environment (PHE) self-healing classification model is required, wherein the PHE self-healing classification model is stored in the PHE, based on the first determination, performing the resynchronization with the PHE self-healing classification model to obtain a synchronized client self-healing classification model, applying the synchronized client self-healing classification model to the upgrade issue report to obtain a state of the upgrade issue report, making a second determination that the state indicates a self-healable state, based on the second determination, performing a self-healing process on the application based on the upgrade issue report, and storing a resolution report based on results of the self-healing process, wherein the PHE is operatively connected to the customer environment.

In general, in one aspect, the invention relates to a system that includes a processor and memory that includes instructions, which when executed by the processor, perform a method. The method includes obtaining, by a client in a customer environment, an upgrade issue report for the application, making a first determination that a resynchronization of a client self-healing classification model with the production host environment (PHE) self-healing classification model is required, wherein the PHE self-healing classification model is stored in the PHE, based on the first determination, performing the resynchronization with the PHE self-healing classification model to obtain a synchronized client self-healing classification model, applying the synchronized client self-healing classification model to the upgrade issue report to obtain a state of the upgrade issue report, making a second determination that the state indicates a self-healable state, based on the second determination, performing a self-healing process on the application based on the upgrade issue report, and storing a resolution report based on results of the self-healing process, wherein the PHE is operatively connected to the customer environment.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing a customer environment.

Specifically, embodiments of the invention include utilizing a machine learning algorithm to determine whether a component (e.g., an upgrade management agent) has the capability of servicing an upgrade issue notification. The component may include a prediction system that trains a self-healing prediction model using previously-obtained upgrade issue notifications. The self-healing prediction model may be applied to new incoming upgrade issue notifications to determine which, if any, of the new incoming upgrade issue notifications may be performed automatically (e.g., without the use of a person). In one or more embodiments of the invention, for any of the upgrade issue notifications serviced by a person (e.g., an information technology support specialist), additional entries may be generated based on how such upgrade issues were serviced. The additional entries may be utilized to further train the self-healing prediction model.

If the self-healing is not determined to be possible, a second determination is performed to determine whether a resynchronization is required with a self-healing prediction model in the production host environment. Such determination may be based on policies for resynchronization with the production host environment. Further, the determination may be based on a response by the production host that the self-healing prediction model in the production host environment has experienced a significant update such that the output of the self-healing prediction model of the production host environment is likely to be different from that of the self-healing prediction model of the customer environment. If a resynchronization is determined, the production host environment may initiate the resynchronization process, which may include updating the self-healing prediction model in the customer environment, and re-applying the upgrade issue notification to the updated self-healing prediction model.

Following the determination that the self-healing is possible and that no more resynchronization is required, the update issue notification is forwarded to an information technology support specialist. The update issue notification may be provided as a support ticket. The information technology support specialist may service the support ticket.

Figure 1:
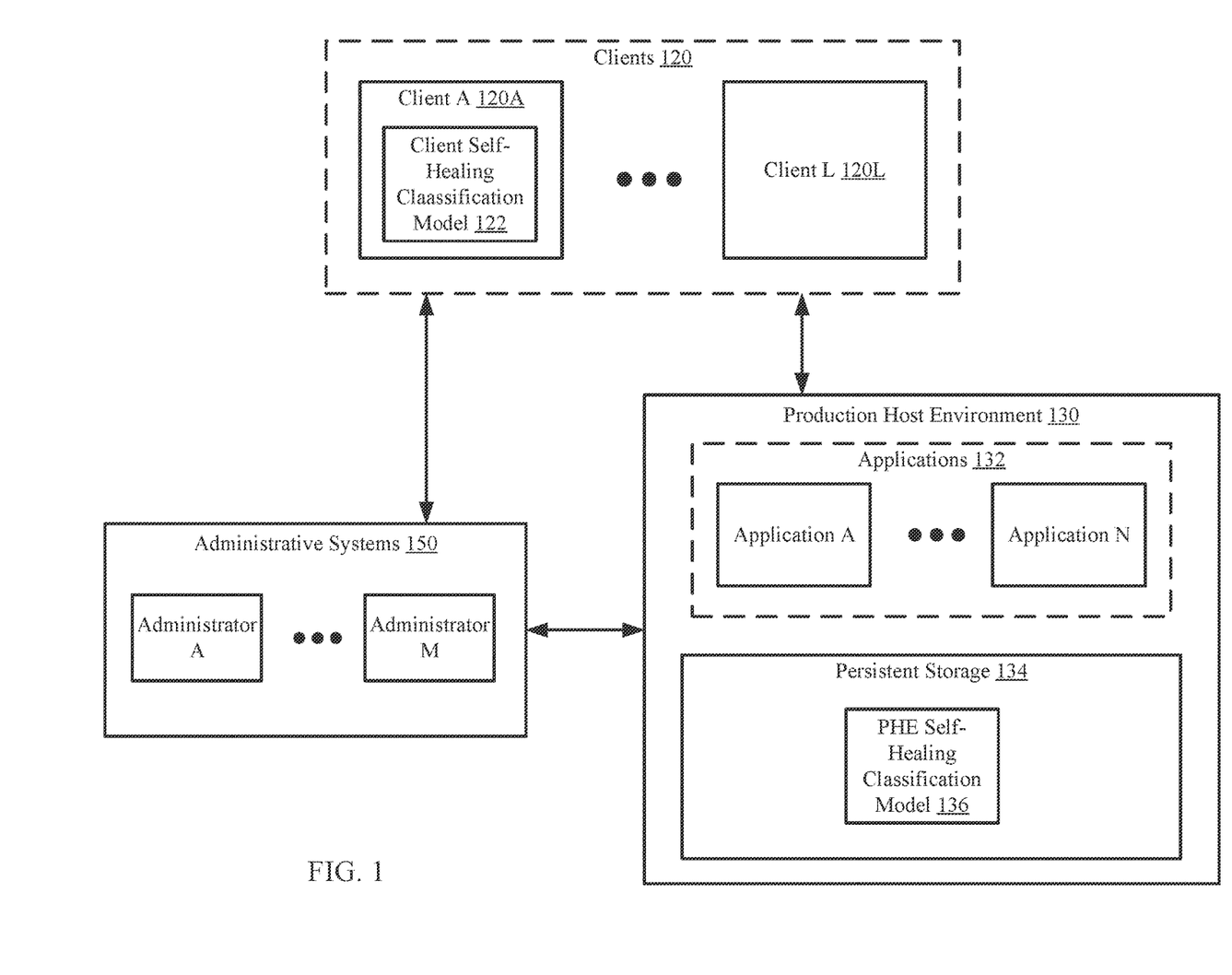
FIG. 1 shows a diagram of a system in accordance with one or more embodiments of the invention.

FIG. 1 shows an example system in accordance with one or more embodiments of the invention. The system includes one or more clients (120), a production host environment (130) and an administrative system (150). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the clients (120) utilize the services provided by the applications (132) in the production host environment (PHE) (130). The clients (120) may further manage the upgrades of the applications (132). Each client (120A, 120L) may utilize a self-healing prediction model to be used for classifying upgrade issue notifications. The self-healing prediction model may be generated in accordance with FIG. 2A.

In one or more embodiments of the invention, as discussed throughout the application, an upgrade issue notification is a data structure that specifies issues (if any) occurring as an application attempts to upgrade to a newer version. The upgrade issue notifications may specify, for example, a cause of the issue. Examples of issues may include, but are not limited to, an authentication error, a timeout in an application programming interface (API) attempting to execute the upgrade, a task in an upgrade pipeline failing to execute, and/or an exception to a rest response. Other examples of upgrade issues may be specified in an upgrade issue notification without departing from the invention. The client may apply the generated self-healing classification model (122) to incoming upgrade issue reports. The classification model may be applied in accordance with the method of FIG. 2B.

Figure 4:
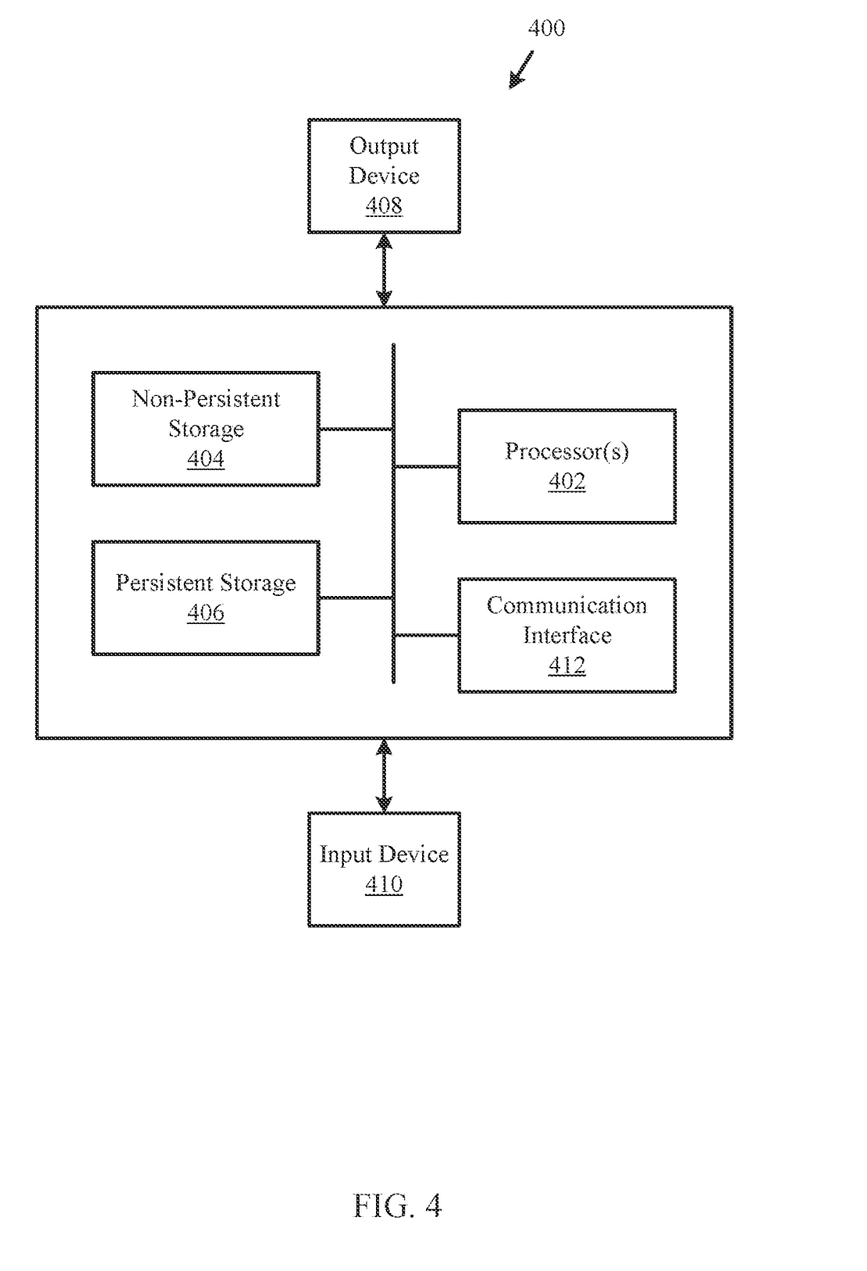
FIG. 4 shows a diagram of a computing device in accordance with one or more embodiments of the invention.

In one or more embodiments of the invention, each client (120A, 120L) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of each client (120A, 120L) described throughout this application and/or all, or a portion thereof, of the methods illustrated in FIGS. 2A-2B.

In one or more embodiments of the invention, each client (120A, 120L) is implemented as a logical device. The logical device may utilize the computing resources of any number of computing devices and thereby provide the functionality of the client (120A, 120L) described throughout this application and/or all, or a portion thereof, of the methods illustrated in FIGS. 2A-2B.

In one or more embodiments of the invention, the production host environment (130) hosts applications (132). The applications (142) may be logical entities executed using computing resources (not shown) of the production host environment (130). Each of the applications may be performing similar or different processes. In one or more embodiments of the invention, the applications (132) provide services to users, e.g., clients (not shown). For example, the applications (132) may host components. The components may be, for example, instances of databases, email servers, and/or other components. The applications (132) may host other types of components without departing from the invention.

In one or more of embodiments of the invention, the applications (132) are implemented as computer instructions, e.g., computer code, stored on a persistent storage (e.g., 134) that when executed by a processor(s) of the production host environment (130) cause the production host environment (130) to provide the functionality of the applications (132) described throughout this application.

In one or more embodiments of the invention, the production host environment (130) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

In one or more embodiments of the invention, the production host environment (130) is implemented as a logical device. The logical device may utilize the computing resources of any number of computing devices and thereby provide the functionality of the production host environment (130) described throughout this application.

In one or more embodiments of the invention, each of the administrative systems (150) is a system for solving upgrade issues. The upgrade issues solved by the administrative systems (150) may be upgrade issues that were determined to not be self-healable (discussed in FIGS. 2A-2B). To solve the upgrade issues, the administrative system (150) may be operated by information technology specialists. The information technology specialists may determine the solutions to be used to solve the upgrade issues specified in the obtained upgrade issue notifications. The information technology specialists, via the administrative system (150), may generate resolution reports. In one or more embodiments of the invention, a resolution report is a data structure that specifies a previous upgrade issue, whether the upgrade issue was resolved, and any details regarding how the upgrade issue was solved.

In one or more embodiments of the invention, the administrative system (150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the administrative system (150) described throughout this application.

In one or more embodiments of the invention, the administrative system (150) is implemented as a logical device. The logical device may utilize the computing resources of any number of computing devices and thereby provide the functionality of the administrative system (150) described throughout this application.

Figure 2A:
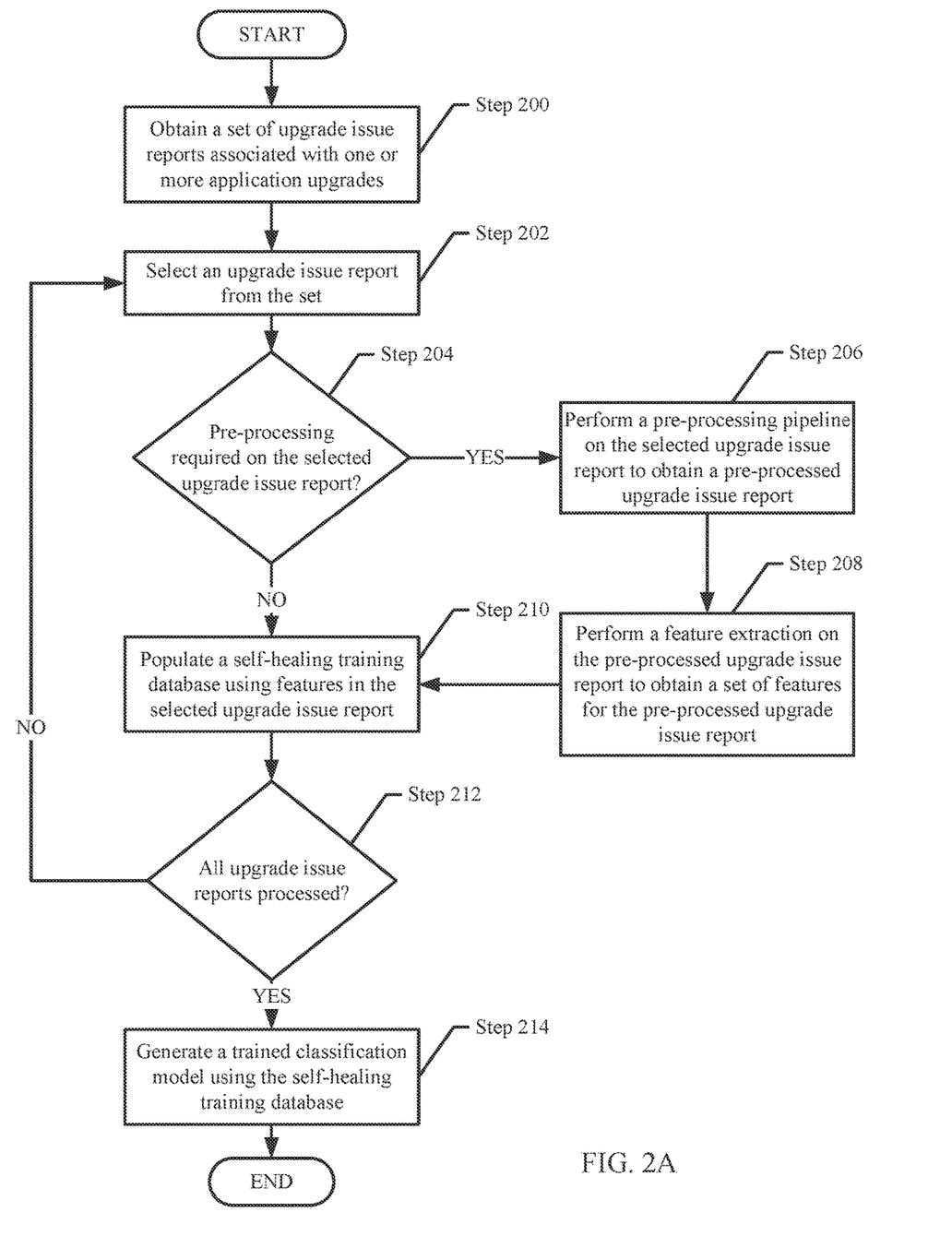
FIG. 2A shows a flowchart for training a self-healing classification model in accordance with one or more embodiments of the invention.
Figure 2B:
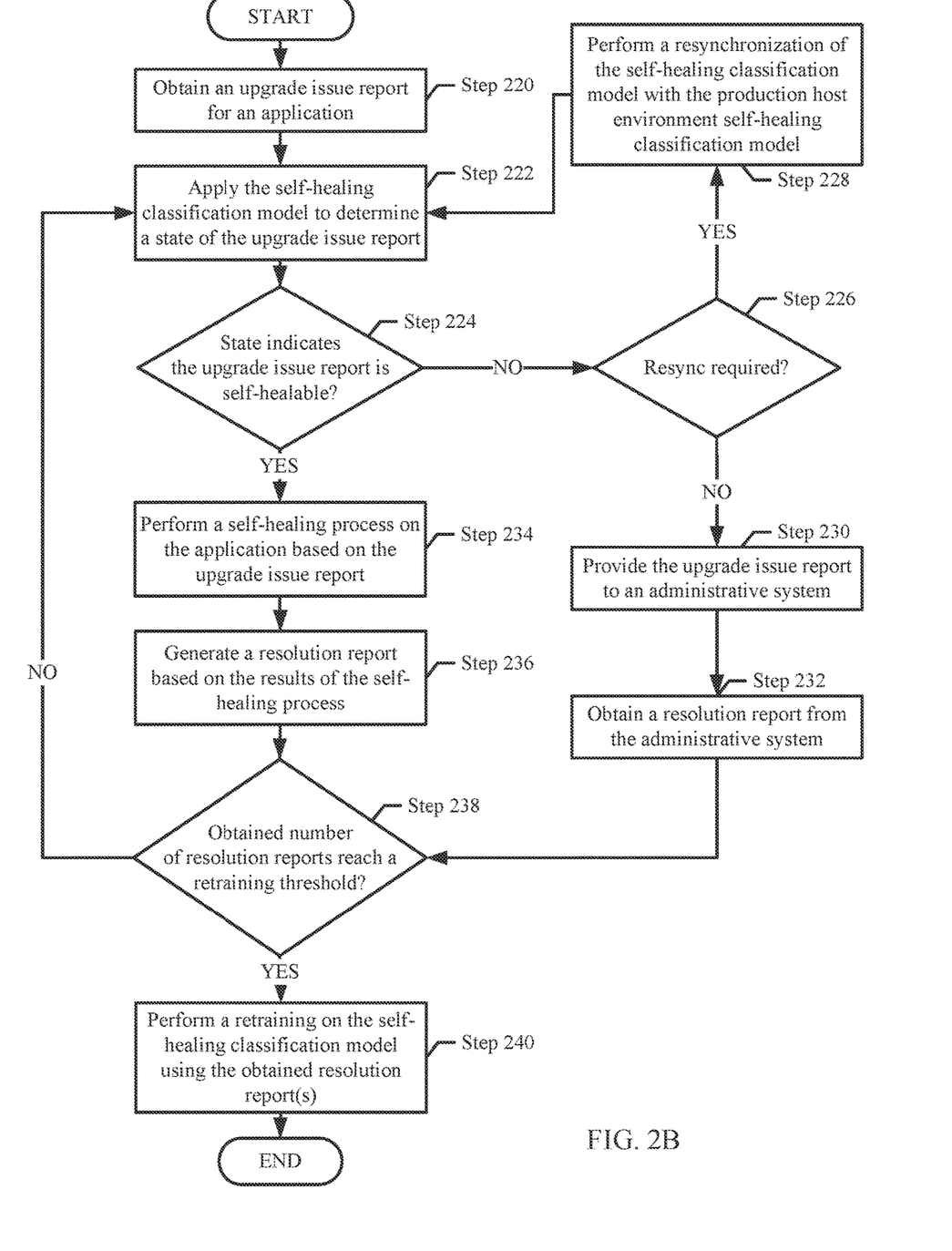
FIG. 2B shows a flowchart for managing upgrade issue reports in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for training a self-healing classification model in accordance with one or more embodiments of the invention. The method shown in FIG. 2A may be performed by, for example, a client (e.g., 120A, 120L, FIG. 1). Other components of the system illustrated in FIG. 1 may perform the method of FIG. 2A without departing from the invention.

Turning to FIG. 2A, in step 200, a set of upgrade issue reports is obtained. In one or more embodiments of the invention, the set of upgrade issue reports may specify two or more issues detected during an attempt to upgrade one or more applications to newer versions.

In step 202, an upgrade issue report is selected from the set. The selected upgrade issue report may be one that has not been processed.

In step 204, a determination is made about whether a preprocessing is required on the selected upgrade issue report. In one or more embodiments of the invention, the determination is based on whether the upgrade issue report is formatted such that the upgrade issue report includes non-useful information. In one or more embodiments of the invention, the non-useful information may include any information that is determined not to be relevant for classifying whether the upgrade issue report is self-healable.

In one or more embodiments of the invention, an upgrade issue is self-healable if the ability exists, as determined by the application upgrade management system, or other entity, to resolve the upgrade issue without the involvement of an information technology support specialist, or any other person.

In one or more embodiments of the invention, the non-useful information may be identified by performing a content analysis on the upgrade issue report. The content analysis may include parsing the upgrade issue report to identify the content, analyzing each portion of the content to determine whether: (i) a majority of the content is relevant to the classification, and (ii) the content is formatted in a manner favorable for training. If either (i) or (ii) is not met, then preprocessing may be required. If pre-processing is required, the method proceeds to step 206; otherwise, the method proceeds to step 210.

In step 206, a pre-processing pipeline is performed on the selected upgrade issue report. In one or more embodiments of the invention, the pre-processing report includes removing any identified non-useful information. The pre-processing may further include re-formatting the content in the upgrade issue report such that the classification training may be applied. The re-formatting may be performed on the upgrade issue report if such action is necessary for the feature extraction discussed in step 208. The result of the upgrade issue report is a pre-processed upgrade issue report.

In step 208, a feature extraction is performed on the pre-processed issue report. In one or more embodiments of the invention, the feature extraction is a process for identifying and classifying relevant features specified in the upgrade issue report. The relevant features may include identifying unique portions of the selected upgrade issue report and attributing a unique score (e.g., a numerical value) to the unique portion. Each unique portion and the attributed unique score may collectively be included in the set of features generated during the feature extraction.

In step 210, a self-healing training database is populated. In one or more embodiments of the invention, the self-healing training database is a data structure that, when fully populated, specifies the set of upgrade issue notifications and the features of the upgrade issue notifications. The self-healing training database may be stored in the client. The features may be the features extracted in step 208 for at least a portion of the set of upgrade issue notifications.

In one or more embodiments of the invention, the set of features may be any combination of the set of features generated in step 208 and/or any set of pre-existing features specified in the upgrade issue report.

In step 212, a determination is made about whether all upgrade issue reports are processed. If all upgrade issue reports are processed, the method proceeds to step 214; otherwise, the method proceeds to step 202.

In step 214, a trained classification model is generated using the self-healing training database. In one or more embodiments of the invention, the training may include applying a z-score to each upgrade issue report based on the corresponding set of features and a specification about whether the upgrade issue was previously determined to be self-healable. The z-score may be a numerical value that may be used to group the upgrade issue reports based on similar features. For example, a first set of upgrade issue reports that are self-healable may each be associated with a z-score that is similar to other upgrade issue reports in the same set. The z-score may be generated by applying any combination of the unique scores, mean scores of the unique scores, variances of unique scores, and/or any other attributes of the upgrade issue report.

FIG. 2B shows a flowchart for managing upgrade issue reports in accordance with one or more embodiments of the invention. The method shown in FIG. 2B may be performed by, for example, a client (e.g., 120A, 120L, FIG. 1). Other components of the system illustrated in FIG. 1 may perform the method of FIG. 2B without departing from the invention.

In step 220, an upgrade issue report is obtained for an application. In one or more embodiments of the invention, the obtained upgrade issue report is not part of the set of upgrade issue reports processed in FIG. 2A. In one or more embodiments of the invention, the upgrade issue report is generated in response to an upgrade issue occurring following an attempt to upgrade the application.

In step 222, the self-healing classification model is applied to the upgrade issue report. In one or more embodiments of the invention, the self-healing classification model is an updated self-healing classification model obtained following a retraining of the self-healing classification model. Additionally, the self-healing classification model may be a resynchronized self-healing classification model (discussed below). The result of applying the self-healing classification model is a determination about whether the upgrade issue report is self-healable or not. The state of the upgrade issue report may specify such determination.

In step 224, a determination is made about whether the state indicates the upgrade issue report is self-healable. If the upgrade issue report is self-healable, the method proceeds to step 226; otherwise, the method proceeds to step 230.

In step 226, following the determination that the upgrade issue report is not self-healable, a second determination is made about whether a resynchronization is required. In one or more embodiments of the invention, the determination to resynchronize is based on an administrative system monitoring the operation of the self-healing classification model operating in the customer environment (e.g., the client self-healing classification model) and the self-healing classification model operating in the production host environment (e.g., the PHE self-healing classification model).

For example, consider a scenario in which the PHE self-healing classification model has undergone resynchronizations with self-healing classification models of other customers. In such scenarios, the PHE self-healing classification may be significantly different from the client self-healing classification model. The administrative system monitoring the resynchronizations may determine that a significant amount of resynchronizations has been performed in the PHE self-healing classification model that a resynchronization is required.

If the resynchronization is required, the method proceeds to step 228; otherwise, the method proceeds to step 230.

In step 228, a resynchronization of the self-healing classification model (also referred to as the client self-healing classification model) is performed with the PHE self-healing classification model. In one or more embodiments of the invention, the resynchronization includes updating the client self-healing classification model such that it is similar to the PHE self-healing classification model. In this manner, following the resynchronization, the client self-healing classification model and the PHE self-healing classification model are identical.

In step 230, following the determination that the resynchronization is not required and following the determination that the upgrade issue report is not self-healable, the upgrade issue report is provided to an administrative system. The upgrade issue report may be serviced (e.g., the upgrade issue may be attempted to be resolved) by the administrative system. The administrative system may send a response to the application upgrade management system based on the servicing. The response may specify the details of the resolution.

In step 232, a resolution report is obtained from the administrative system.

In one or more embodiments of the invention, the resolution report is generated by the administrative system in response to servicing the upgrade issue report. The resolution report may specify the resolution used to service the upgrade issue report, the upgrade issues corresponding to the upgrade issue reports, and/or any other information associated with the servicing of the upgrade issue report by the administrative system without departing from the invention.

In one or more embodiments of the invention, the resolution report is generated by the application upgrade management system in response to the servicing of the upgrade issue report by the administrative system. For example, the administrative system may provide a notification to the application upgrade management system specifying the servicing of the upgrade issue report. In response to the notification, the application upgrade management system may generate the resolution report to specify the servicing of the upgrade issue report.

In step 234, following the determination that the upgrade issue report is self-healable, a self-healing process is performed on the application based on the upgrade issue report. In one or more embodiments of the invention, the self-healing process includes identifying a potential solution obtained based on the self-healing classification model. The solution may be specified in the obtained state of step 222.

In step 236, a resolution report is generated based on the results of the self-healing process. In one or more embodiments of the invention, the resolution report is generated to specify the upgrade issue of the upgrade issue report, the details for how the upgrade issue was resolved, and/or any other details regarding the resolution of the upgrade issue report.

In step 238, a determination about whether the obtained number of resolution reports reached a retraining threshold. In one or more embodiments of the invention, the retraining threshold is a criterion for determining a point in which to initiate a retraining of the self-healable classification model using new resolution reports. The retraining threshold may be determined by the administrative system or by any other entity without departing from the invention. If the obtained resolution reports reached a retraining threshold, the method proceeds to step 240; otherwise, the method proceeds to step 222.

In step 240, a retraining is performed on the self-healing classification model using the obtained resolution reports. In one or more embodiments of the invention, the retraining includes applying a similar training as discussed in step 214 of FIG. 2A using the obtained resolution reports.

EXAMPLE

Figure 3A:
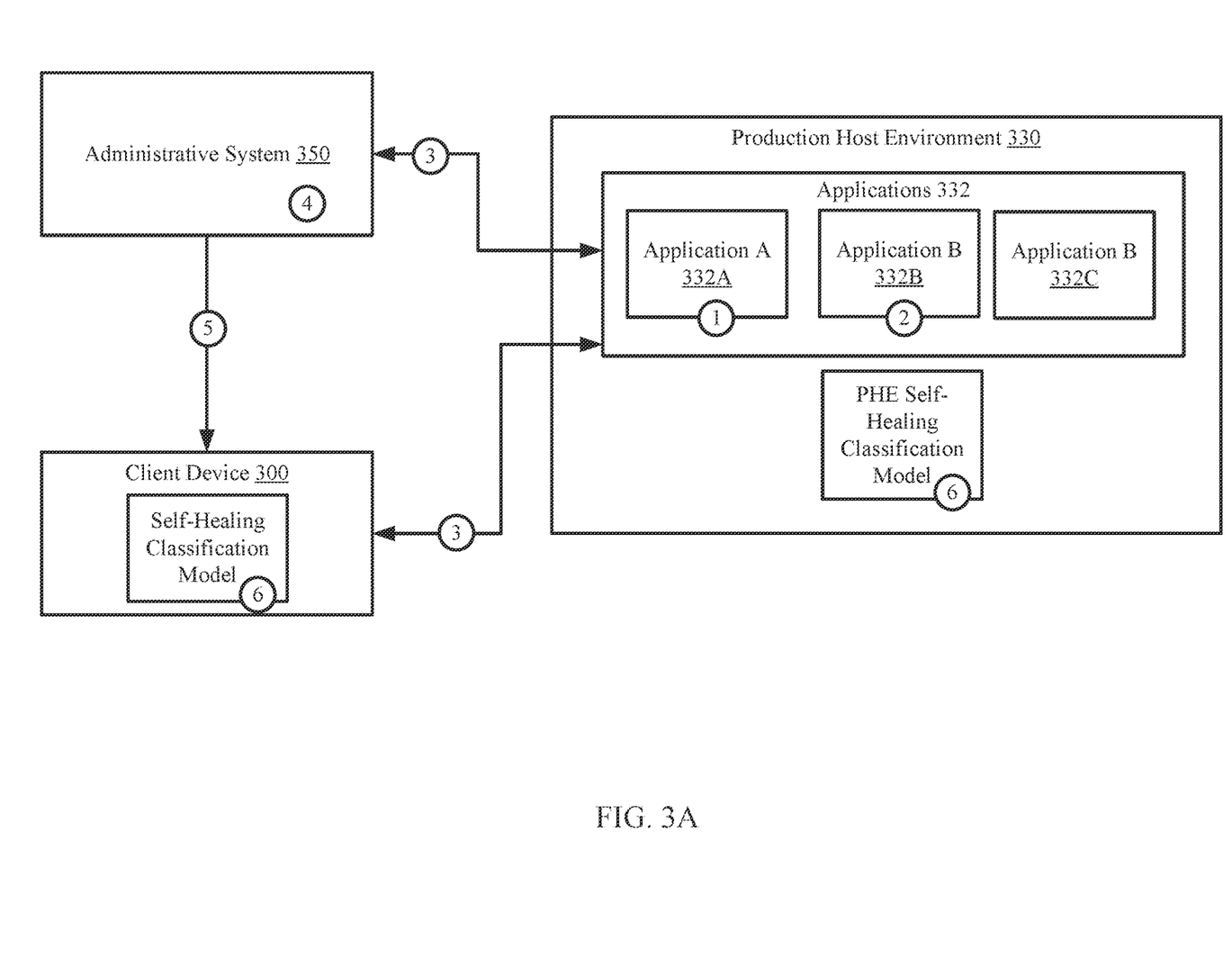
FIGS. 3A-3B show an example in accordance with one or more embodiments of the invention.
Figure 3B:
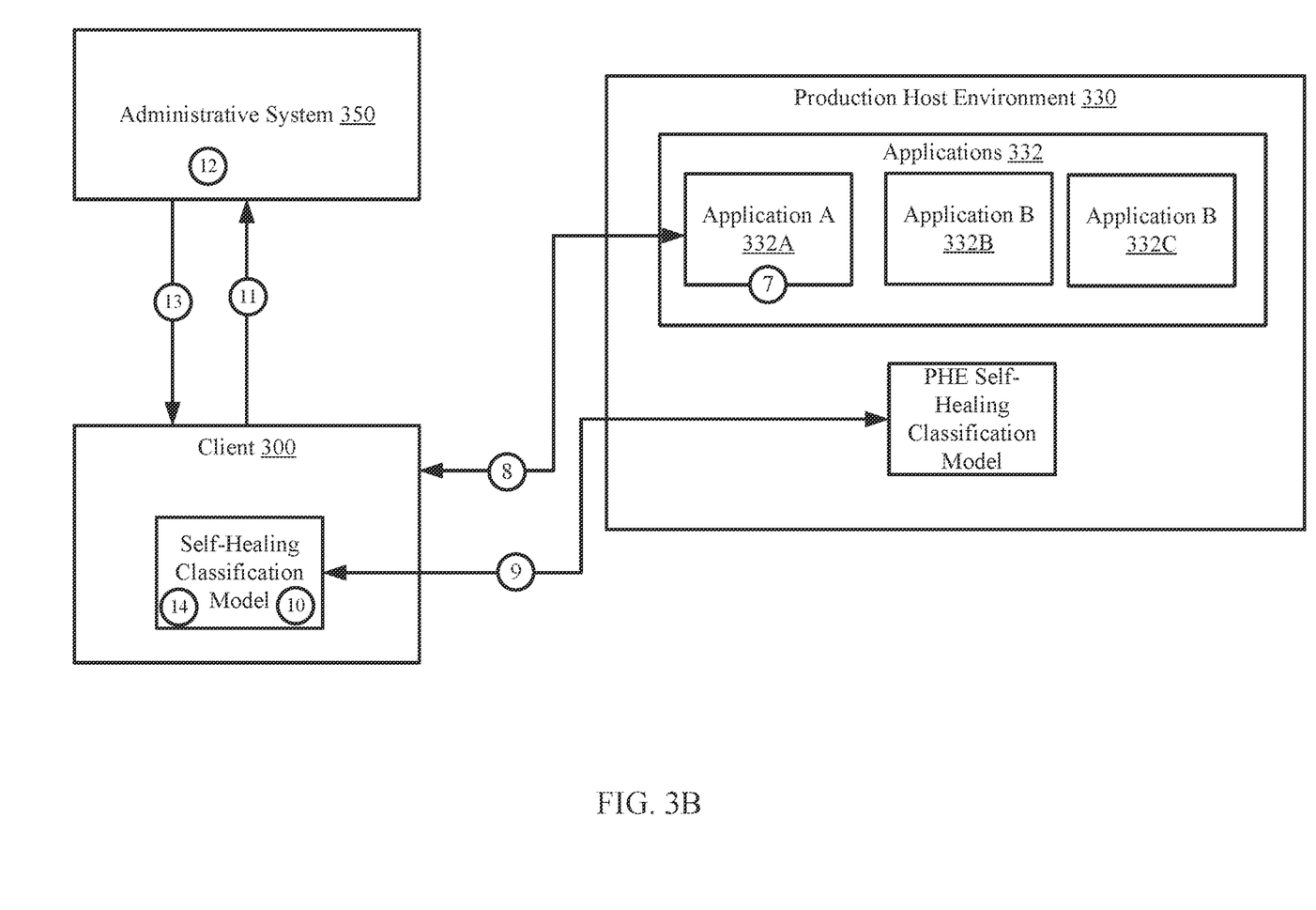

The following section describes an example. The example, illustrated in FIGS. 3A-3B, is not intended to limit the invention and is independent from any other examples discussed in this application. Turning to the example, consider a scenario in which a production host environment executes a set of applications to be upgraded to a newest version.

FIG. 3A shows an example system in accordance with one or more embodiments of the invention. For the sake of brevity, not all components of the example system may be illustrated. The example system includes a production host environment (330), an administrative system (350), and a client (300).

At a first point in time, an applications A, B, and C (332A, 332B, 332C) are executing on the production host environment (330). The applications may utilize any computing resources (physical or logical) provided by the production host environment (330). During the operation of the applications (332), an attempt to upgrade the applications (332) to a newer version is initiated. During the attempt, application A (332A) and application B (332B) experience a failure [1] [2]. The failure to update the two applications (332A, 332B) is specified in upgrade issue notifications. After a rebooting of application B (332B), the upgrade issues are resolved, and the upgrade is successful. A copy of each of the upgrade issue notifications is sent to each of the administrative system (350) and the client (300) [3].

The administrative system (350) is used by information technology specialists to attempt to resolve the upgrade issue report for application A (332A) [4]. The resolution of the upgrade issue is specified in a resolution report generated by the administrative system (350). The generated resolution reports are provided to the application upgrade management system (300) [5]. The resolution report includes a set of features that may be used to classify the upgrade issue report of application A (332A).

The application upgrade management system (300) may use the resolution report for resolving the upgrade issue of application A (332A) and the upgrade issue notification for application B (332B) to generate a self-healing classification model [6]. The self-healing classification model is also stored in the production host environment (330).

FIG. 3B shows a diagram of the system at a later point in time. At this later point in time, application A (332A) experiences another failure while attempting to upgrade to a second newer version [7]. An upgrade issue notification is generated by the production host environment (330) and provided to the client (300) [8]. The client (300) performs the method of FIG. 2B to determine that a resynchronization is required with the PHE self-healing classification model. Based on the determination, the resynchronization is performed [9]. The result is a resynchronized self-healing classification model stored in the client (300). The client (300) applies the resynchronized self-healing classification model to the upgrade issue notification [10]. The result of applying the resynchronized self-healing classification model is a determination that the upgrade issue is not self-healable.

Based on the determination, the upgrade issue notification is forwarded to the administrative system (350) [11]. An information technology specialist operating the administrative system (350) resolves the upgrade issue, and successfully reattempts to upgrade application A (332A) [12]. The information technology specialist generates a resolution report to be provided to the application upgrade management system (300) that specifies the details for resolving the upgrade issue [12]. The obtained resolution report is used by the client (300) to retrain the resynchronized self-healing classification model to better predict whether a future upgrade issue notification is self-healable [14]. Specifically, the resolution report specifies that the resolution performed by information technology specialist could have been performed automatically without the use of the information technology specialist. Following the retraining, the self-healing classification model will be able to more accurately determine that upgrade issues such as the one experienced by application A (332A) will be self-healable.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention reduce the cognitive burden on operational specialists managing the upgrades of applications in a production host environment. Specifically, embodiments of the invention improve the nature of resolving issues that come up during attempts to upgrade applications to newer versions. In a system where a large number of upgrade issues may occur, and the number of operational specialists (e.g., information technology specialists) is limited, performing the classification of whether an upgrade issue is self-healable may reduce the effort applied by the operational specialists to resolve upgrade issues that may be resolved with a computing device without the help of the operational specialists. Further, the time taken to resolve the large number of upgrade issues may be reduced by implementing embodiments of the invention.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing an application in a production host environment, the method comprising:
   obtaining, by a client in a customer environment, an upgrade issue report for the application;
   making a first determination that a resynchronization of a client self-healing classification model with the production host environment (PHE) self-healing classification model is required, wherein the PHE self-healing classification model is stored in the PHE, and wherein the first determination is based on a synchronization of the PHE self-healing classification model that has been performed with a second customer environment;
   based on the first determination, performing the resynchronization with the PHE self-healing classification model to obtain a synchronized client self-healing classification model;
   applying the synchronized client self-healing classification model to the upgrade issue report to obtain a state of the upgrade issue report;
   making a second determination that the state indicates a self-healable state;
   based on the second determination,
      performing a self-healing process on the application based on the upgrade issue report; and
      storing a resolution report based on results of the self-healing process,
   wherein the PHE is operatively connected to the customer environment.

2. The method of claim 1, further comprising:
   after the storing, performing a retraining on the synchronized client self-healing classification model using the resolution report to obtain an updated synchronized client self-healing classification model;
   obtaining a second upgrade issue report for the application;
   applying the updated synchronized self-healing classification model to the second upgrade issue report to obtain a second state of the second upgrade issue report;
   making a second determination that the second state does not indicate the self-healable state; and
   based on the second determination:
      providing the second upgrade issue report to an administrative system;
      receiving a response from the administrative system; and
      storing a second resolution report based on the response.

3. The method of claim 1, further comprising:
   prior to obtaining the upgrade issue report:
      obtaining a set of upgrade issue reports associated with the application, wherein the upgrade issue report is not one of the set of upgrade issue reports;
      populating a self-healing training database using a set of features for each of the set of upgrade issue reports, wherein the self-healing training database is stored in the customer environment; and
      after populating the self-healing training database, generating the client self-healing classification model based on the self-healing training database.

4. The method of claim 3, further comprising:
   prior to populating the self-healing training database:
      identifying a portion of the set of upgrade issue reports of a first type;
      performing a pre-processing pipeline on the portion of the set of upgrade issue reports to obtain processed upgrade issue reports; and
      performing a feature extraction on the processed update issue reports to identify a first portion of the set of features.

5. The method of claim 4, wherein a second portion of the set of upgrade issue reports comprises a second portion of the set of features.

6. The method of claim 4,
   wherein identifying the portion of the set of upgrade issue reports with the first type comprises performing a content analysis to identify non-useful information, and
   wherein performing the pre-processing pipeline comprises removing the non-useful information.

7. The method of claim 1,
   wherein the upgrade issue report is generated based on at least a result of an attempt to upgrade the application.

8. A non-transitory computer readable medium comprising computer readable program code, which when executed by a computer processor enables the computer processor to perform a method for managing applications, the method comprising:
   obtaining, by a client in a customer environment, an upgrade issue report for the application;
   making a first determination that a resynchronization of a client self-healing classification model with the production host environment (PHE) self-healing classification model is required, wherein the PHE self-healing classification model is stored in the PHE, and wherein the first determination is based on a synchronization of the PHE self-healing classification model that has been performed with a second customer environment;
   based on the first determination, performing the resynchronization with the PHE self-healing classification model to obtain a synchronized client self-healing classification model;
   applying the synchronized client self-healing classification model to the upgrade issue report to obtain a state of the upgrade issue report;
   making a second determination that the state indicates a self-healable state;
   based on the second determination,
      performing a self-healing process on the application based on the upgrade issue report; and
      storing a resolution report based on results of the self-healing process,
   wherein the PHE is operatively connected to the customer environment.

9. The non-transitory computer readable medium of claim 8, the method further comprising:
   after the storing, performing a retraining on the synchronized client self-healing classification model using the resolution report to obtain an updated synchronized client self-healing classification model;

obtaining a second upgrade issue report for the application;

applying the updated synchronized client self-healing classification model to the second upgrade issue report to obtain a second state of the second upgrade issue report;

making a second determination that the second state does not indicate the self-healable state; and based on the second determination:
providing the second upgrade issue report to an administrative system;
receiving a response from the administrative system; and
storing a second resolution report based on the response.

10. The non-transitory computer readable medium of claim 9, the method further comprising:

prior to obtaining the upgrade issue report:
obtaining a set of upgrade issue reports associated with the application, wherein the upgrade issue report is not one of the set of upgrade issue reports;
populating a self-healing training database using a set of features for each of the set of upgrade issue reports; and
after populating the self-healing training database, generating the self-healing classification model based on the self-healing training database.

11. The non-transitory computer readable medium of claim 10, the method further comprising:

prior to populating the self-healing training database:
identifying a portion of the set of upgrade issue reports of a first type; performing a pre-processing pipeline on the portion of the set of upgrade issue reports to obtain processed upgrade issue reports; and performing a feature extraction on the processed update issue reports to identify a first portion of the set of features.

12. The non-transitory computer readable medium of claim 11, wherein a second portion of the set of upgrade issue reports comprises a second portion of the set of features.

13. The non-transitory computer readable medium of claim 11, wherein identifying the portion of the set of upgrade issue reports of the first type comprises performing a content analysis to identify non-useful information, and wherein performing the pre-processing pipeline comprises removing the non-useful information.

14. The non-transitory computer readable medium of claim 8, wherein the upgrade issue report is generated based on at least a result of an attempt to upgrade the application.

15. A system comprising:
a processor; and
memory comprising instructions, which when executed by the processor, perform a method comprising:
obtaining, by a client in a customer environment, an upgrade issue report for the application;
making a first determination that a resynchronization of a client self-healing classification model with the production host environment (PHE) self-healing classification model is required, wherein the PHE self-healing classification model is stored in the PHE, and wherein the first determination is based on a synchronization of the PHE self-healing classification model that has been performed with a second customer environment;

based on the first determination, performing the resynchronization with the PHE self-healing classification model to obtain a synchronized client self-healing classification model;

applying the synchronized client self-healing classification model to the upgrade issue report to obtain a state of the upgrade issue report;

making a second determination that the state indicates a self-healable state;

based on the second determination,
performing a self-healing process on the application based on the upgrade issue report; and
storing a resolution report based on results of the self-healing process,
wherein the PHE is operatively connected to the customer environment.

16. The system of claim 15, further comprising:

after the storing, performing a retraining on the synchronized client self-healing classification model using the resolution report to obtain an updated synchronized client self-healing classification model;

obtaining a second upgrade issue report for the application;

applying the updated synchronized client self-healing classification model to the second upgrade issue report to obtain a second state of the second upgrade issue report;

making a second determination that the second state does not indicate the self-healable state; and based on the second determination:
providing the second upgrade issue report to an administrative system;
receiving a response from the administrative system; and
storing a second resolution report based on the response.

17. The system of claim 15, further comprising:

prior to obtaining the upgrade issue report:
obtaining, a set of upgrade issue reports associated with the application, wherein the upgrade issue report is not one of the set of upgrade issue reports;
populating a self-healing training database using a set of features for each of the set of upgrade issue reports; and
after populating the self-healing training database, generating the self-healing classification model based on the self-healing training database.

18. The system of claim 17, further comprising:

prior to populating the self-healing training database:
identifying a portion of the set of upgrade issue reports of a first type;
performing a pre-processing pipeline on the portion of the set of upgrade issue reports to obtain processed upgrade issue reports; and
performing a feature extraction on the processed update issue reports to identify a first portion of the set of features.

19. The system of claim 18, wherein a second portion of the set of upgrade issue reports comprises a second portion of the set of features.

20. The system of claim 18, wherein identifying the portion of the set of upgrade issue reports of the first type comprises performing a content analysis to identify non-useful information, and wherein performing the pre-processing pipeline comprises removing the non-useful information.

* * * * *